United States Patent [19]

Honda et al.

[11] Patent Number: 5,720,203

[45] Date of Patent: Feb. 24, 1998

[54] TWIN-CLUTCH-TYPE-TRANSMISSION

[75] Inventors: Atsushi Honda; Hirofumi Nakada; Masafumi Kinoshita, all of Susono; Kojiro Kuramochi, Numazu, all of Japan

[73] Assignee: Toyota Jidosha Kabushiki Kaisha, Toyota, Japan

[21] Appl. No.: 686,064

[22] Filed: Jul. 24, 1996

[30] Foreign Application Priority Data

Jul. 25, 1995 [JP] Japan .................................. 7-188907

[51] Int. Cl.⁶ ..................................................... F16H 3/08
[52] U.S. Cl. ............................ 74/325; 74/329; 74/331
[58] Field of Search ............................ 74/325, 329, 330, 74/331

[56] References Cited

U.S. PATENT DOCUMENTS

| | | | |
|---|---|---|---|
| 4,463,621 | 8/1984 | Fisher | 74/331 X |
| 4,513,631 | 4/1985 | Koivunen | 74/331 X |
| 4,738,149 | 4/1988 | Janiszewski | 74/331 X |
| 4,966,048 | 10/1990 | Braun | 74/331 X |
| 5,385,064 | 1/1995 | Reece | 74/331 |
| 5,429,005 | 7/1995 | Fukui et al. | 74/325 |

FOREIGN PATENT DOCUMENTS

| | | | |
|---|---|---|---|
| 720884 | 4/1942 | Germany | 74/330 |
| 175845 | 9/1985 | Japan | 74/329 |
| 1196288 | 12/1985 | U.S.S.R. | 74/330 |

*Primary Examiner*—Khoi Q. Ta
*Attorney, Agent, or Firm*—Oblon, Spivak, McClelland, Maier & Neustadt, P.C.

[57] ABSTRACT

A twin-clutch-type transmission, which has a general input shaft, a first clutch connected with a first clutch output shaft, a second clutch connected with a second clutch output shaft, a sub shaft, and a general output shaft disposed parallel to the first clutch output shaft and the second clutch output shaft, is improved to effectively use the space around the sub shaft. A first gear connected to the first clutch output shaft and a second gear connected to the sub shaft associatingly interlock the sub shaft and the first clutch output shaft while being meshed to each other. A fifth gear and a sixth gear disposed on the general output shaft are respectively meshed with the third gear and the fourth gear which are connected to the second clutch output shaft and selectively connected to the general output shaft with a first synchronizing device disposed on the general output shaft, and interlock the second clutch output shaft and the general output shaft in association with the third gear and the fourth gear. A seventh gear meshed with the fifth gear and a eighth gear meshed with the fourth gear disposed on the sub shaft interlock the sub shaft and the general output shaft by selectively connecting the seventh gear and the eighth gear themselves to the sub shaft by the second synchronizing device so as to complete the first forward speed gearing in addition to completing the reverse gearing.

7 Claims, 5 Drawing Sheets

Fig. 2

| | C1 | C2 | S1 | | | S2 | | S3 | | | F |
|---|---|---|---|---|---|---|---|---|---|---|---|
| | | | 2 | N | 4 | 1 | R | 3 | N | 5 | |
| FIRST SPEED GEARING | ○ | | ○ | | | ○ | | | ○ | | ○ |
| SECOND SPEED GEARING | ○ | ○ | ○ | | | ○ | | | ○ | | |
| THIRD SPEED GEARING | ○ | | □ | | □ | ○ | | ○ | | | |
| FOURTH SPEED GEARING | ○ | ○ | | | ○ | ○ | | □ | | | |
| FIFTH SPEED GEARING | ○ | | | | □ | ○ | | | | ○ | |
| REVERSE GEARING | ○ | | ○ | | | | ○ | | ○ | | |

TWIN-CLUTCH-TYPE-TRANSMISSION

BACKGROUND OF THE INVENTION

1. Field of the Invention

The present invention relates to a twin-clutch-type transmission.

2. Description of the Related Art

A twin-clutch-type transmission for a plurality of forward speed gearings and one reverse gearing having two clutches respectively connected to a general input shaft, two clutch output shafts connected respectively to the two clutches on a common axis, a sub shaft and a general output shaft respectively disposed parallel to the two clutch output shafts has been disclosed (Japanese Unexamined Patent Publication No. 6-221347).

In the above transmission, a sub shaft driven gear which meshes with a sub shaft drive gear disposed on one of the clutch output shafts, and a reverse drive gear, and synchronizing device for selectively connect the sub shaft and the sub shaft driven gear are disposed on the sub shaft, wherein the reverse gearing is completed by the gear for the reverse gearing and a gear which is disposed on the general output shaft and meshed with a gear for one of forward speed gearing connected to the other clutch out shaft, i.e. the clutch out shaft which does not rotate the sub shaft.

The above transmission can obtain shorter axial length, by employing the sub shaft and by the common use of a gear i.e., a gear for one of the forward speed gearings connected to the other clutch out shaft is also used for completing the reverse gearing.

However, in the above transmission the sub shaft is only used for completing the reverse gearing, and a space which is not used is left around the sub shaft except a part where the sub shaft driven gear is disposed and a part where the reverse drive gear is disposed.

SUMMARY OF THE INVENTION

Therefore, an object of the present invention is to provide a twin-clutch-type transmission which effectively uses the space around the sub shaft.

According to the present invention there is provided a twin-clutch-type transmission, having a general input shaft, a first clutch, a second clutch, a first clutch output shaft connected to the first clutch, a second clutch output shaft connected to the second clutch, a sub shaft disposed parallel to the first clutch output shaft and the second clutch output shaft, and general output shaft disposed parallel to the first clutch output shaft and the second clutch output shaft, which comprises a first gear connected to the first clutch output shaft, a second gear connected to the sub shaft and meshed with the first gear which interlocks the sub shaft and the first clutch output shaft in association with the first gear, a first synchronizing device disposed on the general output shaft, a third gear and a fourth gear connected to the second clutch output shaft, a fifth gear and a sixth gear disposed on the general output gear, and respectively meshed with the third gear and the fourth gear, and selectively connected to the general output shaft with the first synchronizing device, which interlocks the second clutch output shaft and the general output shaft in association with the third gear and said fourth gear, a second synchronizing device disposed on the sub shaft, a seventh gear disposed on the sub shaft and meshed with the fifth gear for reverse gearing, and a eighth gear disposed on the sub shaft and meshed with the fourth gear for the first forward speed gearing, wherein the seventh gear and the eighth gear interlock the sub shaft and the general output shaft by selectively connecting the seventh gear and the eighth gear themselves to the sub shaft through the second synchronizing device so as to complete the first forward speed gearing in addition to completing the reverse gearing.

The present invention will be more fully understood from the description of preferred embodiments of the invention set forth below, together with the accompanying drawings.

BRIEF DESCRIPTION OF THE DRAWINGS

In the drawings:

FIG. 2 is a table showing combinations of operating conditions of clutches and sleeves and one-way clutches for obtaining each speed gearing.

DESCRIPTION OF THE PREFERRED EMBODIMENTS

Figure 1:
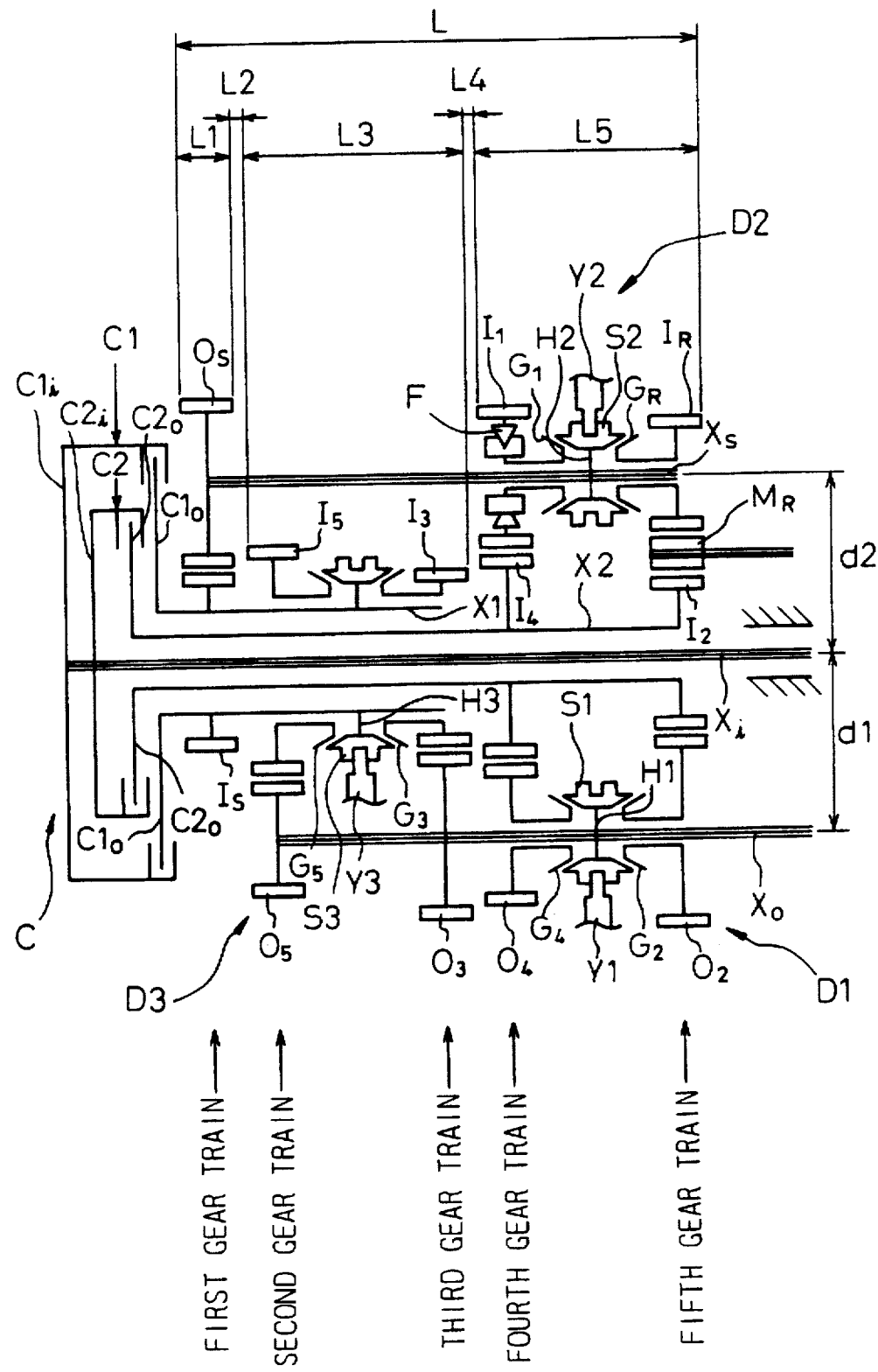
FIG. 1 is a schematic view of the first embodiment of the present invention.

The first embodiment shown in FIG. 1 is a twin-clutch-type transmission having five forward speed gearings and one reverse gearing for an automobile.

In FIG. 1, a clutch C is composed of a first clutch C1 and a second clutch C2. An input plate $C1_i$ of the first clutch C1 and an input plate $C2_i$ of the second clutch C2 are connected to an general input shaft $X_i$ which itself is connected to an output shaft of an engine (not shown).

The first clutch C1 and second clutch C2 are engaged and disengaged by oil-pressure controlled by an oil pressure supply control device (not shown).

A first clutch output shaft X1 and a second clutch output shaft X2 are respectively connected to an output disc $C1_0$ of the first clutch C1 and a second output disc $C2_0$ of the second clutch C2. The first clutch output shaft X1 and the second clutch output shaft X2 are both arranged to be diametrically outside of and coaxial with the input shaft $X_i$.

A sub shaft $X_S$ and an general output shaft $X_O$ are disposed parallel to those shafts.

A sub shaft drive gear $I_S$, a fifth speed drive gear $I_5$ and a third speed drive gear $I_3$ are disposed on the first clutch output shaft X1 in the above order from the side of clutch C, and a third synchronizing device D3 is also disposed between the third speed drive gear $I_3$ and the fifth speed drive gear $I_5$. The sub shaft drive gear $I_S$ is permanently connected to the first clutch output shaft X1, and thereby always rotates therewith. The fifth speed drive gear $I_5$ and the third speed drive gear $I_3$ are attached rotatably to the first clutch output shaft X1 and selectively connected thereto by the third synchronizing device D3, as follows.

The third synchronizing device D3 is composed of a third hub H3 which is permanently connected to the first clutch output shaft X1 and a third sleeve S3 which is slidably attached on the outer peripheral surface of the third hub H3. The third sleeve S3 is shifted by not shown means through a third shifter fork Y3 so as to be meshed with a third speed synchro gear $G_3$ which is permanently connected to the third speed drive gear $I_3$ or a fifth speed synchro gear $G_5$ which is permanently connected to the fifth speed drive gear $I_5$ and thereby selectively connect the third speed drive gear $I_3$ or the fifth speed drive gear $I_5$ to the first clutch output shaft X1.

A second speed drive gear $I_2$ and a fourth speed drive gear $I_4$ are permanently connected to the second clutch output shaft X2.

A fifth speed driven gear $O_5$ which always meshes with the fifth speed drive gear $I_5$, a third speed driven gear $O_3$ which always meshes with the third speed drive gear $I_3$, a fourth speed driven gear $O_4$ which always meshes with the fourth speed drive gear $I_4$, and a second speed driven gear $O_2$ which always meshes with the second speed drive gear $I_2$ are disposed on the general output shaft $X_O$ in the above order from the side of clutch C, and a first synchronizing device D1 is also disposed between the fourth speed driven gear $O_4$ and the second speed driven gear $O_2$. The fifth speed driven gear $O_5$ and the third speed driven gear $O_3$ are permanently connected to the first clutch output shaft X1, thereby always rotates therewith. The fourth speed driven gear $O_4$ and the second speed driven gear $O_2$ are attached rotatably to the first clutch output shaft X1 and selectively connected thereto by the first synchronizing device D1, as follows.

The first synchronizing device D1 is composed of a first hub H1 which is permanently connected to a general output shaft $X_O$ and a first sleeve S1 which is slidably attached to the outer peripheral surface of the first hub H1. The first sleeve S1 is shifted by not shown means through a first shifter fork Y1 so as to be meshed with a fourth speed synchro gear $G_4$ which is permanently connected to the fourth speed driven gear $O_4$ or a second speed synchro gear $G_2$ which is permanently connected to the second speed drive gear $O_2$ and thereby selectively connect the one-way clutch F. The one-way clutch F is engaged only when an inner part thereof which is connected to the second synchronizing device D2 rotates faster than an outer part thereof which is connected to the first speed drive gear $I_1$, and is disengaged in the counter condition.

$M_R$ denotes an idler gear to complete a reverse gearing. The idler gear $M_R$ always meshes with both of the reverse drive gear $I_R$ and the second speed drive gear $I_2$. The idler gear $M_R$ is employed to connect the reverse drive gear $I_R$ to the second speed drive gear $I_2$ when reverse gearing is selected. However, the idler gear $M_R$ can be deleted if the reverse drive gear $I_R$ can be directly meshed with second speed driven gear $O_2$ in consideration of an obtained gear ratio.

The first speed gearing is completed by engaging the first clutch C1, under positioning the first sleeve S1 to a side of second speed driven gear O2, positioning the second sleeve S2 to a side of first speed drive gear $I_1$ and positioning the third sleeve S3 in neutral position and thereby the one-way clutch F being engaged.

In the first speed gearing completed as described above engine output torque is transmitted as follows:

$$X_i \to C1_i \to C1_O \to X1 \to I_5 \to O_5 \to X_S \to H2 \to S2 \to G_1 \to F \to I_1 \to I_4 \to X2 \to I_2 \to O_2 \to G_2 \to S1 \to H1 \to X_O$$

and the total reduction gear ratio is shown as follows, $$r_S \times r_O \times r_2$$

wherein, $r_S$ is a reduction gear ratio of $I_S \to O_S$ $r_O$ is a reduction gear ratio of $I_1 \to I_4$ $r_2$ is a reduction gear ratio of $I_2 \to O_2$.

The second speed gearing is completed by engaging the second clutch C2 and then disengaging the first clutch C1, while keeping each sleeve in the same position as used in the first speed gearing.

In the second speed gearing completed as described above engine output torque is transmitted as follows:

$$X_i \to C2_i \to C2_O \to X2 \to I_2 \to O_2 \to G_2 \to S1 \to H1 \to X_O$$

and the total reduction gear ratio is $r_2$.

In completing the second speed gearing, the first speed drive gear $I_1$ to which the outer part of the one-way clutch F is connected is driven by the fourth speed drive gear $I_4$ with rotating speed of $N \times r_O$, wherein N is a rotating speed of the general input shaft $X_i$.

On the other hand, sub shaft $X_S$ to which the outer part of the one-way clutch F is connected rotates with rotating speed $N/r_S$.

In this regard, by preliminarily choosing the reduction gear ratios to satisfy $r_O > 1/r_S$, double-lock, i.e. one shaft is to be driven by two gear trains having different gear ratios from each other, or free running of engine can be avoided.

Shifting from the second speed gearing to the third speed gearing is completed as follows:

First, the third sleeve S3 is previously shifted to the side of the third speed driven gear $O_3$ and thereby the third speed driven gear $O_3$ is engaged with the general output shaft $X_O$ under a running condition with the second speed gearing, when the shifting from the second speed gearing to the third speed gearing is expected from the vehicle running speed, for example.

Then, the second clutch C2 is disengaged and the first clutch C1 is engaged. Thereby, the third speed gearing which has engagement combination of sleeves and clutches as shown in FIG. 2 is completed.

In the third speed gearing completed as described above engine output torque is transmitted as follows:

$$X_i \to C1_i \to C1_O \to X1 \to H3 \to S3 \to G_3 \to I_3 \to O_3 \to X_O$$

and the total reduction gear ratio is $r_3$, wherein $r_2$ is a reduction gear ratio of $I_3 \to O_3$.

By the following reason, no double-lock occurs, even if, as described above, the third sleeve S3 is previously shifted to the side of the third speed driven gear $O_3$ and thereby the third speed driven gear $O_3$ is engaged with the general output shaft $X_O$ under a running condition with the second speed gearing:

The inner part of the one-way clutch F which is connected to the sub shaft $X_S$ rotates with rotating speed of $N \times (1/r_2) \times r_3 \times (1/r_3) = N/r_S \times (r_3/r_2)$.

On the other hand, the outer part of the one-way clutch F which is connected to the fourth speed drive gear $I_4$ rotates with rotating speed of $N \times r_O$.

Here, $r_O > 1/r_S$ as aforesaid, and $r_3/r_2 < 1$ since $r_2 > r_3$. Therefore, $N \times r_O > N \times (1/r_2) \times r_3 \times (1/r_3)$. Accordingly, the outer part of the one-way clutch F rotates faster than the inner part, and thereby one-way clutch F freely runs and double-lock is avoided.

In the third speed gearing the first sleeve S1 can be positioned on the side of the second driven gear $O_2$, or positioned on the side of the fourth driven gear $O_4$ for preparation of a use of the fourth speed gearing, or positioned in neutral position.

A shifting from the third speed gearing to the fourth speed gearing is completed as follows:

First, the first sleeve S1 is previously shifted to the side of the fourth speed driven gear $O_4$ and thereby the fourth speed driven gear $O_4$ is engaged with the general output shaft $X_O$ under a running condition with the third speed gearing, when the shifting from the third speed gearing to the fourth speed gearing is expected from the vehicle running speed, for example.

Then, the first clutch C1 is disengaged and the second clutch C2 is engaged. Thereby, the fourth speed gearing which has engagement combination of sleeves and clutches as shown in FIG. 2 is completed.

In the fourth speed gearing completed as described above, engine output torque is transmitted as follows:

$$X_i \rightarrow C2_i \rightarrow C2_O \rightarrow X2 \rightarrow I_4 \rightarrow O_4 \rightarrow G_4 \rightarrow S1 \rightarrow H1 \rightarrow X_O$$

and the total reduction gear ratio is $r_4$, wherein $r_4$ is a reduction gear ratio of $I_4 \rightarrow O_4$.

As aforesaid, the first sleeve S1 is previously shifted to the side of the fourth speed driven gear $O_4$ and thereby the fourth speed drive gear $O_4$ is engaged with the general output shaft $X_O$ under a running condition with the third speed gearing, when the shifting from the third speed gearing to the fourth speed gearing is expected.

To avoid a double-lock trouble during the above procedure, the following should be noted.

The outer part of the one-way clutch F which is connected to the fourth speed drive gear $I_4$ rotates with rotating speed of $N \times (1/r_3) \times r_4 \times r_O$.

On the other hand, inner part of the one-way clutch F which is connected to the sub shaft $X_S$ rotates with rotating speed of $N \times (1/r_S)$.

Therefore, by choosing the gear ratios to satisfy the following equation, the outer part of the one-way clutch F can rotate faster than the inner part, and thereby the double-lock trouble can be avoided.

$$(1/r_3) \times r_4 \times r_O > 1/r_S \quad (1)$$

Hereby, $(1/r_3) \times r_4 < 1$, since $r_3 > r_4$.

Therefore, if the above equation (1) is satisfied, the aforesaid $r_O > 1/r_S$ is satisfied. The left part of the equation (1) can be described as follows:

$$(1/r_3) \times r_4 \times r_O$$
$$= (RI_3/RO_3) \times (RO_4/RI_4) \times (RI_4/RI_1)$$
$$= (RI_3/RO_3) \times (RO_4/RI_1).$$

On the other hand, the right part of the equation (1) can be described as follows:

$$1/r_S = RI_S/RO_S$$

wherein, $RI_1$ is a radius of the first speed drive gear $I_1$.

$RI_3$ is a radius of the third speed drive gear $I_3$.

$RO_3$ is a radius of the third speed driven gear $O_3$.

$RI_4$ is a radius of the fourth speed drive gear $I_4$.

$RO_4$ is a radius of the fourth speed driven gear $O_4$.

$RI_S$ is a radius of the sub shaft drive gear $I_S$.

$RO_S$ is a radius of the sub shaft driven gear $O_S$.

Therefore, to satisfy the equation (1), the following equation should be satisfied.

$$(RI_3/RO_3) \times (RO_4/RI_1) > RI_S/RO_S$$

If the reduction gear ratios $r_3$ and $r_S$ are chosen to satisfy $r_3 > r_S$, $RO_4$ and $RI_1$ can be chosen to satisfy $RO_4/RI_1 \geq 1$, i.e. $RO_4 \geq RI_1$.

Therefore, the distance d1 between the common central axis of the first clutch C1 and the second clutch C2, and the central axis of the general output shaft $X_O$, and the distance d2 between the common central axis of the first clutch C1 and the second clutch C2, and the central axis of the sub shaft $X_S$ could be chosen to satisfy the following equation;

$$d1 \geq d2$$

A shifting from the fourth speed gearing to the fifth speed gearing is completed as follows:

First, the third sleeve S3 is previously shifted to the side of the fifth speed driven gear $O_5$ and thereby the fifth speed driven gear $O_5$ is engaged with the general output shaft $X_O$ under a running condition with the fourth speed gearing, when the shifting from the fourth speed gearing to the fifth speed gearing is expected from the vehicle running speed, for example.

Then the second clutch C2 is disengaged and the first clutch C1 is engaged. Thereby, the fifth speed gearing, which has an engagement combination of sleeves and clutches as shown in FIG. 2, is completed.

In the fifth speed gearing completed as described above, engine output torque is transmitted as follows:

$$X_i \rightarrow C1_i \rightarrow C1_O \rightarrow X1 \rightarrow H3 \rightarrow S3 \rightarrow G_5 \rightarrow I_5 \rightarrow O_5 \rightarrow X_O$$

and the total reduction gear ratio is $r_5$, wherein $r_5$ is a reduction gear ratio of $I_5 \rightarrow O_5$.

By the following reason, no double-lock occurs, even if, as described above, the third sleeve S3 is previously shifted to the side of the fifth speed driven gear $O_5$ and thereby the fifth speed driven gear $O_5$ is engaged with the output shaft $X_O$ under a running condition with the second speed gearing:

The inner part of the one-way clutch F which is connected to the sub shaft $X_S$ rotates with rotating speed of $N \times (1/r_4) \times r_5 \times (1/r_S) = N/r_S \times (r_5/r_4)$.

On the other hand, the outer part of the one-way clutch F which is connected to the fourth speed drive gear $I_4$ rotates with rotating speed of $N \times r_O$.

Here, $r_O > 1/r_5$ as aforesaid, and $r_5/r_4 < 1$ since $r_4 > r_5$. Therefore, $N \times r_O > N \times (1/r_4) \times r_5 \times (1/r_S)$. Accordingly, the outer part of the one-way clutch F rotates faster than the inner part, and thereby one-way clutch F freely runs and double-lock is avoided.

In the fifth speed gearing, the first sleeve S1 can be positioned on the side of the fourth driven gear $O_4$ for preparation of a use of the fourth speed gearing, or positioned in neutral position.

The reverse gearing is completed by engaging the first clutch C1, after positioning the first sleeve S1 to a side of second speed driven gear O2, positioning the second sleeve S2 to a side of reverse drive gear $I_R$ and positioning the third sleeve S3 in neutral position.

In the reverse gearing completed as described above engine output torque is transmitted as follows:

$$X_i \rightarrow C1_i \rightarrow C1_O \rightarrow X1 \rightarrow I_5 \rightarrow O_5 \rightarrow X_S \rightarrow H2 \rightarrow S2 \rightarrow G_R \rightarrow I_R \rightarrow M_R \rightarrow$$

$I_2 \rightarrow O_2 \rightarrow G_2 \rightarrow S1 \rightarrow H1 \rightarrow X_O$ and the total reduction gear ratio is shown as follows, $$r_S \times r_R$$

wherein, $r_R$ is a reduction gear ratio of $I_R \rightarrow O_2$

For a description of the axial length of this embodiment of the present invention, the following designations are used.

A gear train composed of the sub shaft drive gear $I_S$ and the sub shaft driven gear $O_S$ which is meshed therewith is designated as the first gear train.

A gear train composed of the fifth speed drive gear $I_5$ and the fifth speed driven gear $O_5$ which is meshed therewith is designated as the second gear train.

A gear train composed of the third speed drive gear $I_3$ and the third speed driven gear $O_3$ which is meshed therewith is designated as the third gear train.

A gear train composed of the first speed drive gear $I_1$ and the fourth speed drive gear $I_4$ which is meshed therewith, and fourth speed driven gear $O_4$ which is meshed with the fourth speed drive gear $I_4$ is designated as the fourth gear train.

A gear train composed of the reverse drive gear $I_R$ and the idler gear $M_R$ which is meshed therewith, and the second speed drive gear $I_2$ which is meshed with the idler gear $M_R$ and the second speed driven gear $O_2$ which is meshed with the second speed drive gear $I_2$ is designated as the fourth gear train.

An axial length of a gear-box part of the twin-clutch-type transmission of the first embodiment of the present invention excluding a part of the clutch C is a length from the left side end of the first gear train to the right side end of the fifth gear train, and is shown by L in FIG. 1.

The above designated L is a summation of L1, L2, L3, L4 and L5, wherein

L1 is a width of the first gear train,

L2 is a clearance between the first gear train and the second gear train,

L3 is a length from the left side end of the second gear train to the right side end of the third gear train, L4 is a clearance between the third gear train and the fourth gear train, and L5 is a length from the left side end of the fourth gear train to the right side end of the fifth gear train.

Actually L2 and L4 are almost equal to zero, therefore L=L1+L3+L5.

This first embodiment is constructed by adding the first speed drive gear $I_1$ on a sub shaft $X_S$ of a four forward speeds gearing and one reverse gearing type twin-clutch-type transmission which does not comprise the first speed drive gear $I_1$ of the prior art previously described.

In the above described four forward speeds gearing and one reverse gearing type twin-clutch-type transmission of the prior art, five gear trains are required and should be arranged same as the first embodiment of the present invention.

An axial length L' of a gear-box part of the twin-clutch-type transmission of the prior art is a summation of L1', L2', L3', L4' and L5', wherein L1' is a width of the first gear train, L2' is a clearance between the first gear train and the second gear train, L3' is a length from the left side end of the second gear train to the right side end of the third gear train, L4' is a clearance between the third gear train and the fourth gear train, and L5' is a length from the left side end of the fourth gear train to the right side end of the fifth gear train.

Actually L2' and L4' are almost equal to zero as in the first embodiment of the present invention, therefore $$L'=L1'+L3'+L5'.$$

wherein L1=L1' and L3=L3', since both in the first embodiment of the present invention having five forward speeds gearing and one reverse gearing and the prior art having four forward speeds gearing and one reverse gearing, the first gear train, the second gear train, the third gear train and the synchronizing device disposed between the second gear train and the third gear train are the same.

Further L5=L5', since the first speed drive gear $I_1$ is arranged to be meshed with the fourth speed drive gear $I_4$ in the fourth gear train which is also provided in the prior art having four forward speeds gearing and one reverse gearing and thereby the length from the left side end of the fourth gear train to the right side end of the fifth gear train are the same.

Accordingly, L=L', that is the first embodiment of the present invention having five forward speed and one reverse and the prior art having four forward speeds gearing and one reverse gearing have the same axial length. Conversely the first embodiment of the present invention having five forward speeds gearing and one reverse gearing can be constructed to have an axial length which is same as the one of the prior art having four forward speeds gearing and one reverse gearing.

Further, in the first embodiment, parts like the valve body which controls the oil pressures used for gear shifting can be easily arranged.

Figure 3:
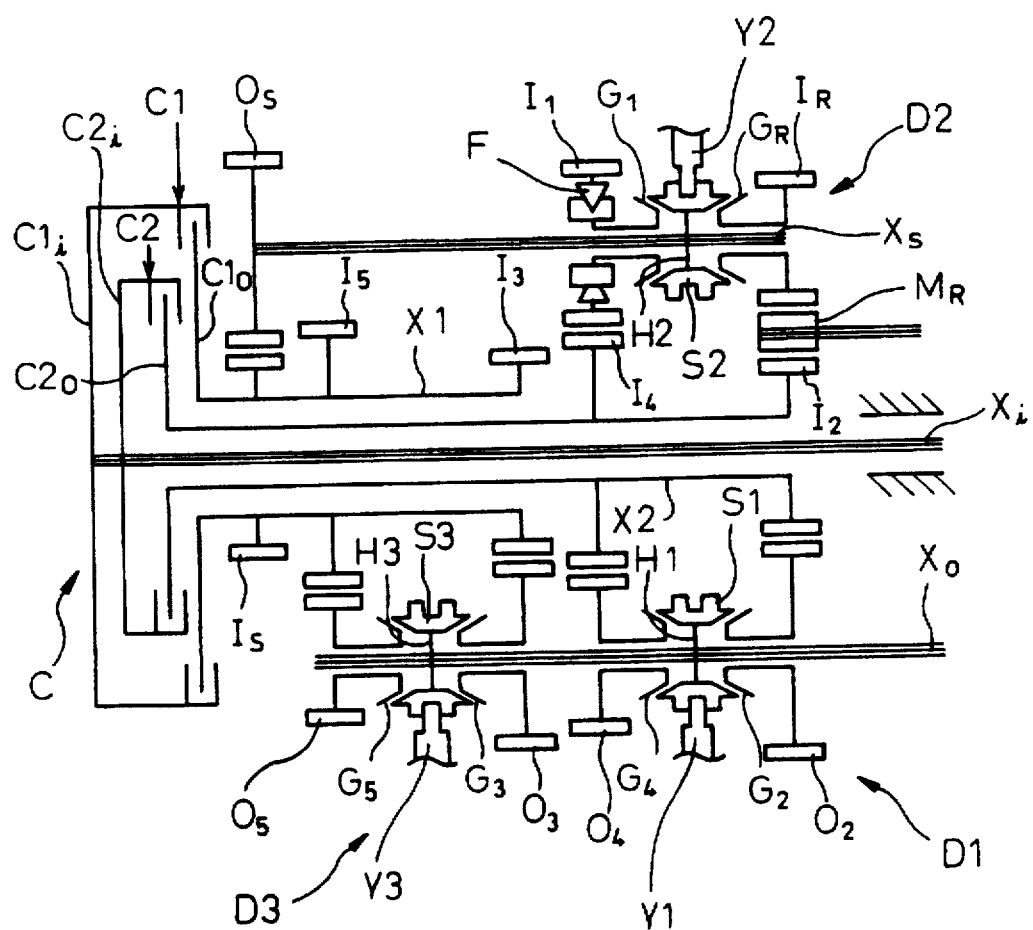
FIG. 3 is a schematic view of the second embodiment of the present invention.

In the second embodiment of the present invention of which schematic view is shown in FIG. 3, the third synchronizing device D3 is disposed on the output shaft $X_O$, while in the first embodiment it is disposed on the first clutch output shaft X1 and connect the first clutch output shaft X1 to the general output shaft $X_O$ when the third speed gearing or the fifth speed gearing is selected.

Following the above change, the third speed drive gear $I_3$ and the fifth speed drive gear $I_5$ are permanently connected and the third speed driven gear $O_3$ and the fifth speed driven gear $O_5$ are respectively provided with the third speed synchro gear $G_3$ and the fifth speed synchro gear $G_5$ and attached rotatably to the general output shaft $X_O$.

However, other parts are arranged same as the first embodiment and have a same axial length.

In this second embodiment, the required engagement combination of sleeves and clutches is same as shown in FIG. 2. In each speed gearing engine output torque is transmitted as follows:

at first speed gearing;

$$X_i \rightarrow C1_i \rightarrow C1_O \rightarrow X1 \rightarrow I_S \rightarrow O_S \rightarrow X_S \rightarrow H2 \rightarrow S2 \rightarrow G_1 \rightarrow F \rightarrow I_1 \rightarrow I_4 \rightarrow$$
$$X2 \rightarrow I_2 \rightarrow O_2 \rightarrow G_2 \rightarrow S1 \rightarrow H1 \rightarrow X_O$$

at second speed gearing;

$$X_i \rightarrow C2_i \rightarrow C2_O \rightarrow X2 \rightarrow I_2 \rightarrow O_2 \rightarrow G_2 \rightarrow S1 \rightarrow H1 \rightarrow X_O$$

at third speed gearing;

$$X_i \rightarrow C1_i \rightarrow C1_O \rightarrow X1 \rightarrow I_3 \rightarrow O_3 \rightarrow G_3 \rightarrow S3 \rightarrow H3 \rightarrow X_O$$

at fourth speed gearing;

$$X_i \to C2_i \to C2_o \to X2 \to I_4 \to O_4 \to G_4 \to S1 \to H1 \to X_O$$

at fifth speed gearing;

$$X_i \to C1_i \to C1_o \to X1 \to I_5 \to O_5 \to G_5 \to S3 \to O3 \to X_O$$

at reverse gearing;

$$X_i \to C1_i \to C1_o \to X1 \to I_S \to O_S \to X_S \to H2 \to S2 \to G_R \to I_R \to M_R \to$$
$$I_2 \to O_2 \to G_2 \to S1 \to H1 \to X_O$$

Figure 4:
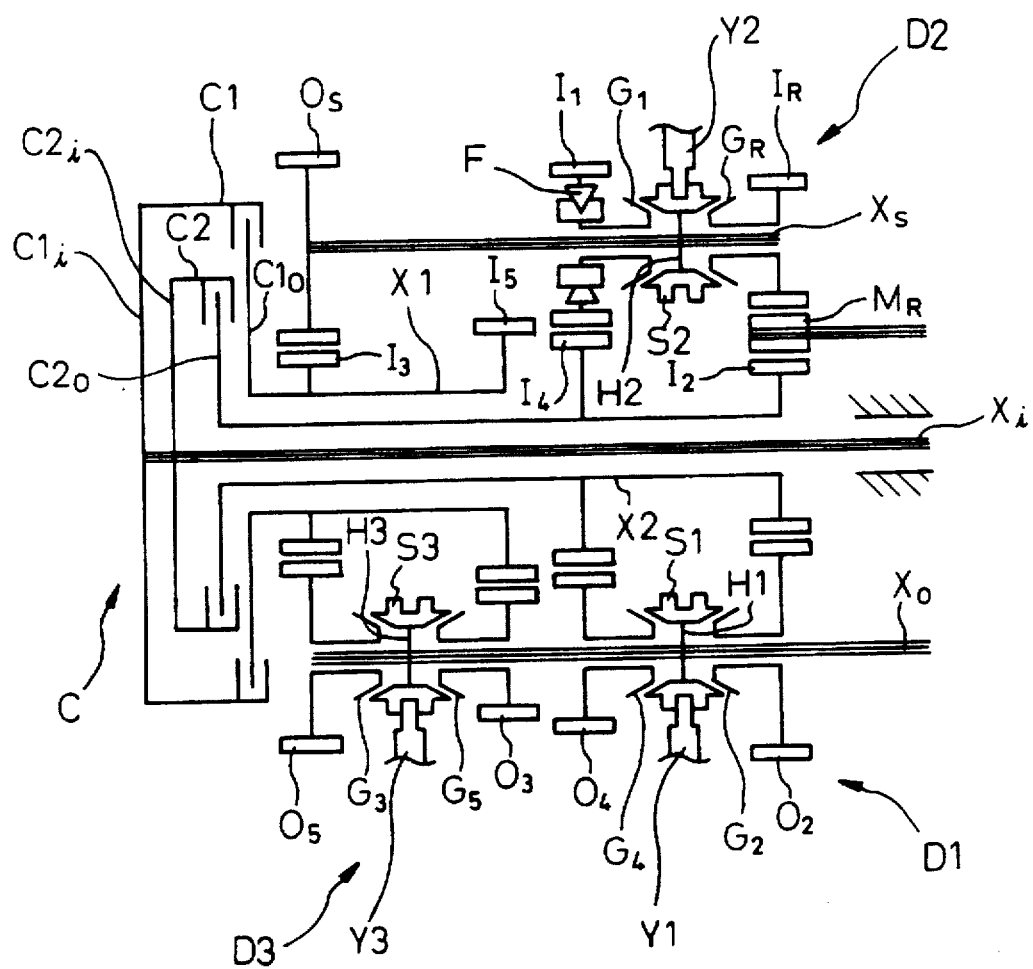
FIG. 4 is a schematic view of the third embodiment of the present invention.

In the third embodiment of the present invention of which a schematic view is shown in FIG. 4, the sub shaft drive gear $I_S$ which is connected to the first clutch output shaft X1 in the second embodiment, is deleted, and the third speed drive gear $I_3$ is arranged near most to the clutch C while being meshed with the sub shaft driven gear $O_S$.

By employing the above described construction, the third embodiment of the present invention can obtain five forward speed and one reverse with four gear trains. Accordingly, the axial length of the third embodiment is shorter than the ones of the first and second embodiments.

In detail, the axial length L of the gear box part of the third embodiment of the present embodiment is a summation of L3 and L5, i.e. L=L3+L5, while L=L1+L3+L5 in the first and second embodiments.

In this third embodiment, the other constructions are same as the second embodiment. The required engagement combination of sleeves and clutches is same as shown in FIG. 2, and the required procedure for shifting gear speeds is same as the second embodiment. Therefore, here only the transmission route of engine output torque is shown in the following:

at first speed gearing;

$$X_i \to C1_i \to C1_o \to X1 \to I_3 \to O_S \to X_S \to H2 \to S2 \to G_1 \to F \to I_1 \to L_4 \to$$
$$X2 \to I_2 \to O_2 \to G_2 \to S1 \to H1 \to X_O$$

at second speed gearing;

$$X_i \to C2_i \to C2_o \to X2 \to I_2 \to O_2 \to G_2 \to S1 \to H1 \to X_O$$

at third speed gearing;

$$X_i \to C1_i \to C1_o \to X1 \to I_3 \to O_3 \to G_3 \to S3 \to H3 \to X_O$$

at fourth speed gearing;

$$X_i \to C2_i \to C2_o \to X2 \to I_4 \to O_4 \to G_4 \to S1 \to H1 \to X_O$$

at fifth speed gearing;

$$X_i \to C1_i \to C1_o \to X1 \to I_5 \to O_5 \to G_5 \to S3 \to O_3 \to X_O$$

at reverse gearing;

$$X_i \to C1_i \to C1_o \to X1 \to I_S \to O_S \to X_S \to H2 \to S2 \to G_R \to I_R \to M_R \to$$
$$I_2 \to O_2 \to G_2 \to S1 \to H1 \to X_O.$$

Figure 5:
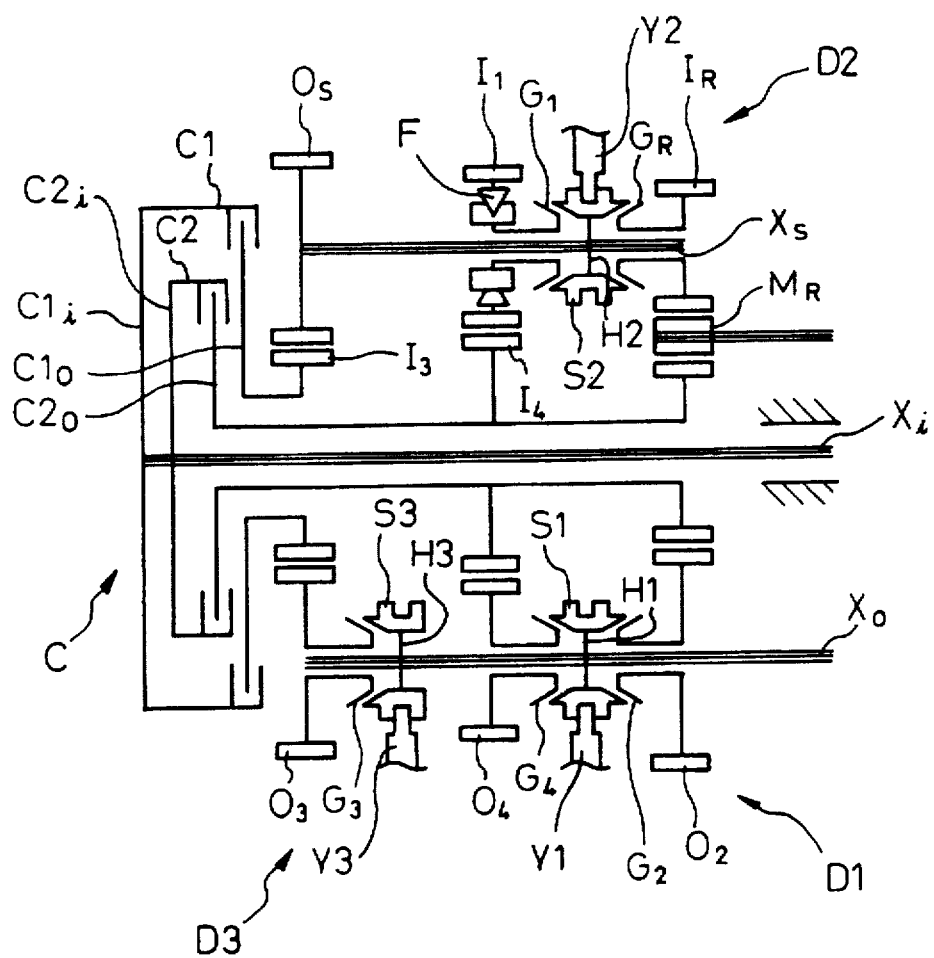
FIG. 5 is a schematic view of the fourth embodiment of the present invention.

The fourth embodiment of the present invention, of which schematic view is shown in FIG. 5, is a four forward speed and one reverse type transmission obtained with deleting a gear train for the fifth speed gearing from the third embodiment of the present invention, i.e. the fifth speed drive gear $I_5$ and the fifth speed driven gear $O_5$ are deleted from the third embodiment.

By employing the above described construction, the third synchronizing device D3 is only required to selectively connect the third speed driven gear $O_3$ with the general output shaft $X_O$, whereby the axial length of the third synchronizing device D3 used in the fourth embodiment is about half of the one used in other embodiments.

Therefore, the axial length of the gear box part of the fourth embodiment is about (0.5×L3)+L5.

In this fourth embodiment, the other constructions are same as in the third embodiment. The required engagement combination of sleeves and clutches is same as those for the third embodiment, the required procedure for shifting gearing, and a transmission route of engine output torque is same as those for the third embodiment, except that parts relating the fifth speed gearing are not used.

As described above, referring the embodiments, in the present invention a space around the sub shaft is used effectively by disposing gears for forward speed gearings on the sub shaft on which the gear for reverse is disposed.

We claim:

1. A twin-clutch-type transmission comprising a general input shaft, a first clutch, a second clutch, a first clutch output shaft connected to said first clutch, a second clutch output shaft connected to said second clutch, a sub shaft disposed parallel to said first clutch output shaft and said second clutch output shaft, and a general output shaft disposed parallel to said first clutch output shaft and said second clutch output shaft;

a first gear connected to said first clutch output shaft;

a second gear connected to said sub shaft and meshed with said first gear, said second gear interlocking said sub shaft and said first clutch output shaft in association with said first gear, a first synchronizing device disposed on said general output shaft;

a third gear and a fourth gear connected to said second clutch output shaft;

a fifth gear and a sixth gear disposed on said general output shaft, and respectively meshed with said third gear and said fourth gear, and selectively connected to said general output shaft with said first synchronizing device, said fifth gear and said sixth gear interlocking said second clutch output shaft and said general output shaft in association with said third gear and said fourth gear;

a second synchronizing device disposed on said sub shaft;

a seventh gear disposed on said sub shaft and meshed with said fifth gear for reverse gearing; and a eighth gear disposed on said sub shaft and meshed with said fourth gear for the first forward speed gearing, said seventh gear and said eighth gear interlocking said sub shaft and said general output shaft by selectively connecting said seventh gear and said eighth gear themselves to said sub shaft through said second synchronizing device so as to complete the first forward speed gearing in addition to completing the reverse gearing.

2. A twin-clutch-type transmission according to claim 1, wherein said seventh gear is meshed with said fifth gear through said third gear and an idly rotating ninth gear.

3. A twin-clutch-type transmission according to claim 1 or 2, wherein an additional gear and an additional synchronizing device for connecting said additional gear to said first clutch output shaft are disposed on said first clutch output shaft, and a gear meshed with said additional gear is disposed on said general output shaft for another forward speed gearing.

4. A twin-clutch-type transmission according to claim 1 or 2, wherein two additional gears and an additional synchronizing device for connecting said additional gear to said first clutch output shaft are disposed on said first clutch output shaft, and two gears meshed with said additional gears are disposed on said general output shaft for two other forward speed gearings.

5. A twin-clutch-type transmission according to claim 1 or 2, wherein a gear meshed with said first gear and a synchronizing device for selectively connecting said gear to said general output shaft is disposed on said general output shaft.

6. A twin-clutch-type transmission according to claim 5, wherein an additional gear is disposed on said general output shaft and said additional gear is selectively connected to general output shaft by said synchronizing device disposed on said general output shaft.

7. A twin-clutch-type transmission according to one of claims 1 or 2, wherein the third gear and the fifth gear are used for completing the second forward speed gearing, and a one-way clutch exclusively transmitting power from the sub shaft to the second clutch output shaft is disposed in a power transmitting route between said second synchronizing device and said eighth gear.

* * * * *